US000001289H

United States Statutory Invention Registration [19]

[11] Reg. Number: H1289

Kyle

[43] Published: Feb. 1, 1994

[54] BOREHOLE TELEVIEWER SYSTEM DEPTH MONITORING AND RECORDING SYSTEM

[75] Inventor: Donald G. Kyle, Plano, Tex.

[73] Assignee: Atlantic Richfield Co., Plano, Tex.

[21] Appl. No.: 965,564

[22] Filed: Oct. 23, 1992

Related U.S. Application Data

[63] Continuation of Ser. No. 574,425, Aug. 28, 1990, abandoned.

[51] Int. Cl.[5] ..... G01V 1/40

[52] U.S. Cl. ..... 367/69; 367/33

[58] Field of Search ..... 367/33, 69; 346/33 WL

[56] References Cited

U.S. PATENT DOCUMENTS

| | | | |
|---|---|---|---|
| 3,369,626 | 2/1968 | Zemanek, Jr. | 367/69 |
| 3,979,714 | 9/1976 | Zemanek, Jr. | 367/33 |
| 4,355,378 | 10/1982 | Dennis et al. | 346/33 WL |
| 4,463,378 | 7/1984 | Rambow | 358/112 |
| 4,774,573 | 9/1988 | Mount, II et al. | 367/69 |
| 4,855,820 | 8/1989 | Barbour | 367/69 |

*Primary Examiner*—Ian J. Lobo

*Attorney, Agent, or Firm*—Joseph E. Rogers

[57] ABSTRACT

A method and an apparatus for recording the depth of a well logging apparatus is provided. The method and apparatus include the direct acquisition of broad depth information from the logging system conversion of the broad depth information to an acceptable digital signal and recording that signal on the audio track of a video cassette recorder. A microcontroller is used to convert broad depth information from either the logging system or the video cassette recorder (in the playback mode) to actual depth and depth rate for use by other displays and plotters.

8 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

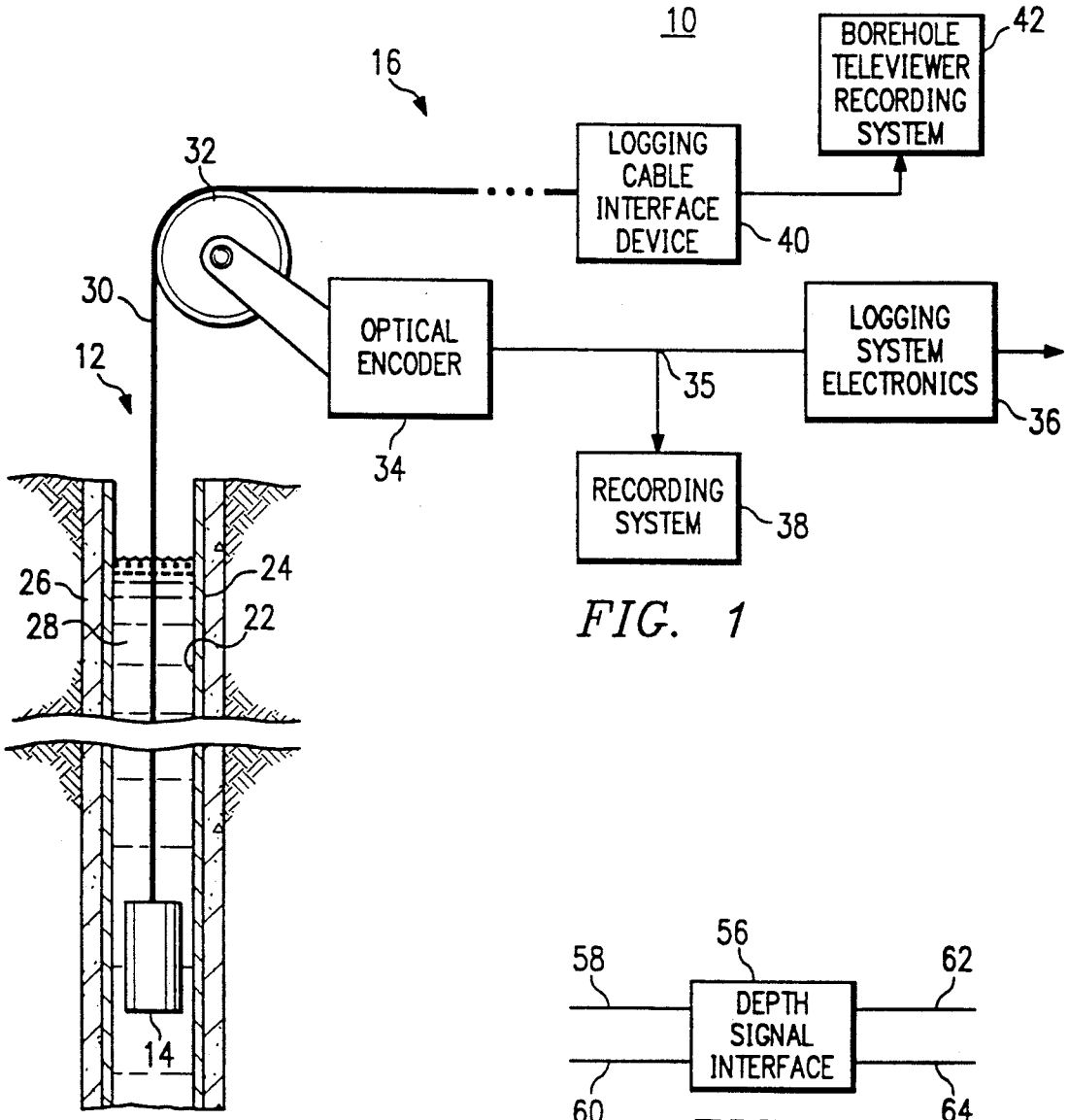
FIG. 1
FIG. 4
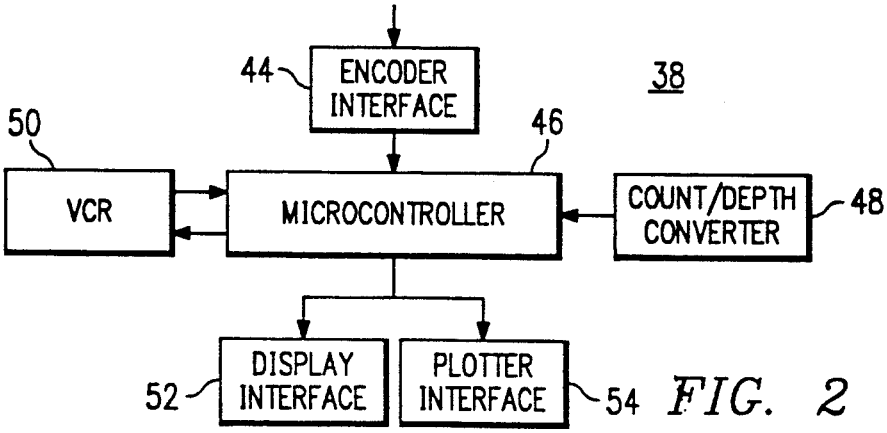
FIG. 2

FIG. 3a
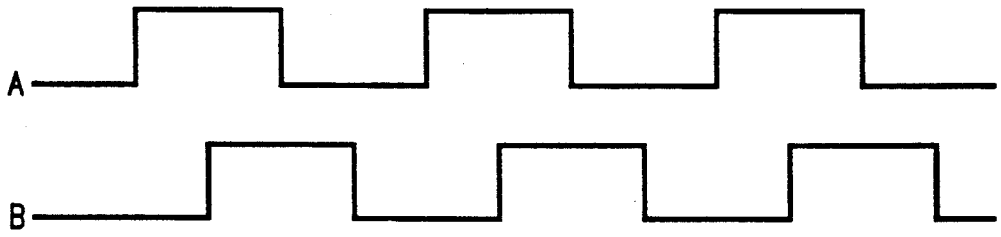
FIG. 3b
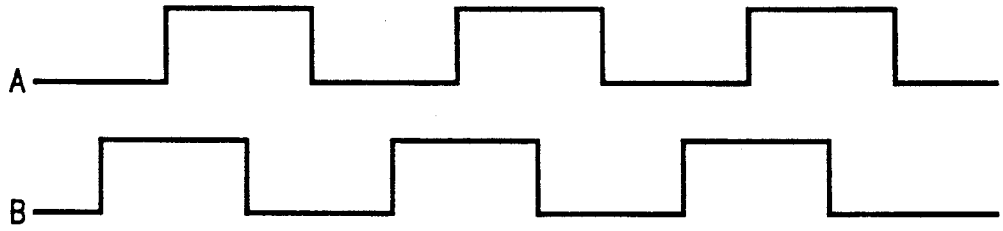
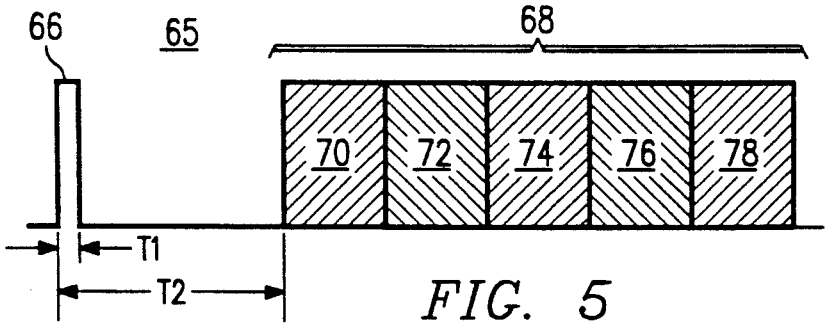
FIG. 5
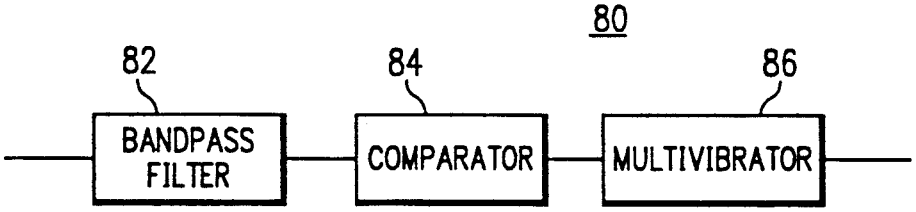
FIG. 6

BOREHOLE TELEVIEWER SYSTEM DEPTH MONITORING AND RECORDING SYSTEM

This application is a continuation of application Ser. No. 07/574,425, now abandoned, filed Aug. 28, 1990.

CROSS REFERENCES TO RELATED APPLICATIONS

This applicaiton is cross-related to U.S. patent application Ser. No. 07/574,315 entitled a "Borehole Televiewer Analog Interface For Video Cassette Recorders" (now abandoned) and U.S. patent application Ser. No. 07/966,129 which is a continuation of Ser. No. 07/819,912 (now abandoned) which is a continuation of U.S. Pat. No. 5,099,236 which issued Mar. 24, 1992.

BACKGROUND OF THE INVENTION

1. Field of the Invention

This invention relates to well logging apparatus and more particularly the monitoring of depth information for well-logging operations.

2. Description of the Related Art

Zemanek, U.S. Pat. No. 3,369,626 discloses an ultrasonic tool for use in scanning the inner surface of an open well or of casing in a borehole. The tool, which is commercially known as the "borehole televiewer" creates a high resolution picture of the inner surface under investigation. The borehole televiewer is used to "see" the inner surface under investigation through drilling mud or other borehole fluids. In an open borehole, the borehole televiewer provides a picture of the formations surrounding the borehole. In a cased borehole, the borehole televiewer provides a picture of the inner surface of the casing, which can be used to determine the condition of the inner surface.

The borehole televiewer uses a rotating ultrasonic transducer, the transducer has a transmitter, to generate acoustic waveforms, and a receiver, to receive the acoustic return. The acoustic return is caused by the reflection of the generated acoustic waveform from the inner surface under investigation.

The acoustic return has two measured parameters, the time of travel of the acoustic return and the amplitude, which give an indication of the condition of the investigated surface.

The transducer rotates three revolutions per second, is pulsed about 500 times per revolution and is pulled up the borehole at a speed of about 5 feet per minute. The transducer spot size, the rotational speed, the pulse repetition rate and the vertical speed combined to provide a full coverage of the investigated inner surface, resulting in high aereal resolution of the inner surface. In the past, depth was correlated with televiewer information by a voice entry on an audio track of a video cassette recorder (VCR). Depth was constantly monitored by the operator and verbally entered every five feet. This type of operation, however, is very tedious for an operator because the boreholes under investigation tend to be very deep and the logging rate is very low. The operator fatigue inherent in this evolution results in human errors being made in the depth correlations.

There is a need, therefore, for a simple and accurate borehole televiewer depth monitoring and recording system which can relieve the operator of this time consuming and tedious task. In addition, there is also a need for a depth monitoring and recording system which provides precise logging rate information at slow logging speeds.

SUMMARY OF THE INVENTION

The present invention will eliminate operator tedium and human error in depth correlations and simply provide an accurate borehole televiewer depth.

The present invention also includes a depth monitoring and recording system for a borehole televiewer comprising an encoder interface, a microcontroller electrically connected to the encoder interface and a reoording device electrically connected to the microcontroller.

Another useful embodiment of the method of the present invention includes the recording of depth information in synchronicity with televiewer data from a borehole televiewer system comprising providing a data input signal having a synchronizing pulse and a depth signal having the same synchronizing pulse and recording the depth and the acoustic return signals on two separate channels.

In addition to solving the problems stated above, the present invention has additional advantages. A major advantage of this invention is relieving the operator of the time consuming and tedious task of verbally entering the depth on VCR audio channel. Additionally, the depths are monitored more accurately and are available in the televiewer unit. Furthermore, the logging depth is monitored more precisely than a conventional logging units which are not normally concerned with logging rates as slow as 5 feet per minute. The present invention also has the additional advantage that its encoding scheme is simple combinatorial logic and the decoding scheme uses very simple analog and logic components. The present invention also has the advantage of reducing the number of recording channels necessary for televiewer operation supporting information and thereby allowing continued use of other analog channels for voice entry.

BRIEF DESCRIPTION OF THE DRAWINGS

Features of the present invention will become apparent when reference is made to the following description taken in conjunction with the accompanying drawings in which:

FIG. 1 is a simplified block diagram of a well logging system.

FIG. 2 is a simplified block diagram of a depth monitoring and recording system for a well logging system.

FIG. 3 shows the time relationship for a quadrature pulsing system signals for up and down counts.

FIG. 4 shows an example of an depth signal interface for a quadrature pulsing system.

FIG. 5 shows the timing relationship for an embodiment ofan encoded depth signal.

FIG. 6 shows a block diagram for depth decoding for use in a playback circuit of a VCR.

FIG. 8(*b*) shows the time relationship of a modified synchronizing signal with a superimposed AGC control signal and a modified acoustic return signal.

FIG. 8(*c*) the time relationship shows the synchronizing signal of FIG. 9(*b*) and the modified acoustic return signal of FIG. 8(*b*) transformed into a time of travel and an amplitude signal.

DESCRIPTION OF PREFERRED EMBODIMENT

Figure 7:
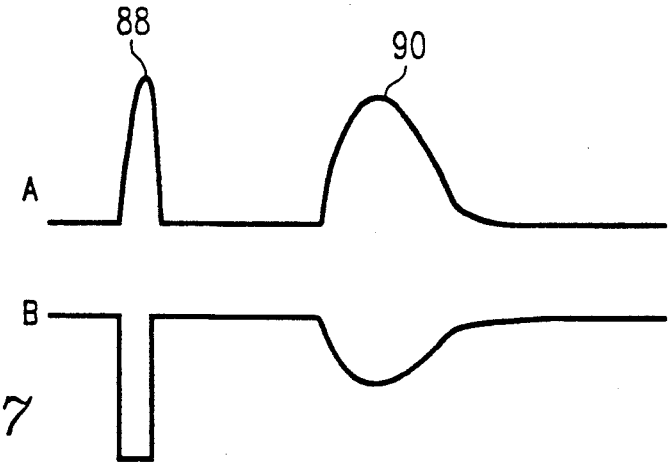
FIG. 7 shows an input signal for a borehole televiewer and a corresponding Automatic Gain Control (AGC) adjusting signal.

FIG. 1 is a simplified block diagram of a well logging system. There is also shown a schematic longitudinal cross section of a cased well borehole 12, an ultrasonic logging apparatus 14 and support surface equipment 16 with which the present invention can be practiced.

The well borehole 12, which is drilled into the earth 18, is for producing oil or natural gas. The well borehole 12 is lined with a length of casing 20. The casing wall has inner and outer surfaces 22, 24. Cement 26 fills the annulus between the casing 20 and the walls of the borehole 12, for at least some of the length of the casing. Cement 26 is used primarily to isolate one formation from another. The interior of the casing is filled with borehole fluids 28, which may be drilling mud, oil or both.

The ultrasonic logging apparatus 14 is located within casing 20 and moves up or down the borehole for logging operations. The logging apparatus 14 is suspended inside of the casing by a logging cable 30, which provides electrical power and communication channels from the surface equipment 16. The ultrasonic logging apparatus 14 includes an ultrasonic transducer (not shown) which serves as a transmitter and receiver. Transducer is oriented so as to generate acoustic waveforms normal to the walls of the casing 20. The acoustic transducer has a resonant frequency of about 20 megahertz and a bandwidth of about 1.0–2.5 megahertz. The logging apparatus is kept centered along the along the longitudinal axis of the casing 20 by centralizers (not shown).

The ultrasonic logging apparatus 14 transmits data uphole to the surface equipment 16 over logging cable 30. The surface equipment 16 includes a sheave wheel 32 over which the logging cable 30 passes. An optical encoder 34 is connected to the sheave wheel 32 and provides an output signal to the logging system electronics 36 and provides a signal to a depth monitoring and recording system 38. Logging cable 30 also provides a signal to a logging cable interface device 40. Logging cable interface device 40 is connected to logging system electronics 36 and the borehole televiewer data recording system 42.

FIG. 2 is a simplified block diagram of a depth monitoring and recording system for a well logging system. Depth monitoring and recording system 38 includes an encoder interface 44 which is connected directly to the output of the optical encoder 34. Encoder interface 44 may be connected to the output of optical encoder 34 using an optical encoder T connection 35 which can be a set of pigtails which allows each logging company's unique optical encoder output to be input into encoder interface 44. Microcontroller 46 is electrically connected to encoder interface 44 and receives inputs from a count/depth converter 48 which may be a set of thumb-wheel switches or a computerized lookup table and receives input from VCR 50 (e.g., a Panasonic AG-6300). Microcontroller 46 provides inputs to VCR 50 and provides outputs to display interface 52 and plotter interface 54. VCR 50 provides data input signals to display interface 52 nnd plotter interface 54 in the playback mode through microcontroller 46.

FIG. 3 is a graph showing the time relationship of pulses in an embodiment of the well logging system, it shows a quadrature pulsing system signals for up and down counts and is an example of one type of input signal which encoder interface 44 is capable of accepting. But other up-count and down-count signal configurations could also be used.

FIG. 3(*a*) shows a typical quadrature pulsing system signature for an up-count (increasing depth) situation. Such a signal is generally produced by optical encoder 34 and is decoded by looking at the value of signal B at the time that signal A is rising. If, for xxample, signal B is low as is shown in FIG. 3(*a*) at the time signal A is rising, then such a system could consider that configuration to be an up-count. Conversely, in the same system, if signal B were high at the time that signal A was rising, the system could consider that situation to be a down-count situation as is shown in FIG. 3(*b*).

FIG. 4 shows an example of an depth signal interface for a quadrature pulsing system. Signals A and B are provided to depth signal interface 56 are provided to input terminals 58 and 60, respectively. Depth signal interface 56 may include, for example, a retriggerable one-shot, multi-vibrator which transforms quadrature pulsing signals A and B and provide up-pulses on one output terminal, for example, output terminal 62 or down-pulses on a different output terminal, for example, output terminal 64.

The operation of depth monitoring and recording system 38 for well logging system 10 can be best understood by once again referring to FIG. 1. Logging cable 30, which is attached to ultrasonic logging apparatus 14 passes sheave wheel 32, which, since it has a fixed circumference, scan be used as a measure of the length of cable that passes over it by counting the number of rotations or portions thereof. Optical encoder 34 produces pulses corresponding to sheave wheel 32 rotations. Optical encoder 34 provides electrical pulses to depth monitoring and recording system 38. As was described above, the output from optical encoder 34 may be in the form of the quadrature of pulses as shown in FIG. 3 or some other similar configuration of pulses. The optical encoder signals may be buffered with a set of differential line receivers, which can be used to receive differential or single-ended inputs as is well-known in the art. In addition, encoder interface 44 may also include a depth signal interface similar to that shown in FIG. 4, for transforming the signal shown in FIG. 3 to a useable input for microcontroller 46. Microcontroller 46 accumulates counts into a raw depth number and, as shown in FIG. 2, uses a pulses per foot scale factor input which is entered from a count/depth converter (for example, thumbwheel switches or a look-up table) to calculate the actual depth. Microcontroller 46 also calculates highly accurate logging speed for presentation to the operator which may be as accurate as, for example, a tenth of a foot per minute. This causes the update of the logging speed to be rather slow at small scale factors but because very accurate monitoring of logging speed is important, slow updates are tolerated.

As was discussed above, VCR 50 receives inputs from microcontroller 46 and from logging cable interface 40. Logging cable interface 40 provides input to the video channel on the VCR 50 while microcontroller 46 provides input to an audio channel of the VCR 50. In addition, a north synchronizing mark-synchronizing pulse is placed on the VCR 50 audio channel with the depth information.

FIG. 5 shows the time relationship of an embodiment of an encoded depth signal 65. The output of microcontroller 46 is an asynchronous serial output having a five word frame of information. The technique for encoding the serial bit stream is a frequency burst technique where a "one" is an output of the frequency and a "zero" is no frequency output. Typical VCR 50 audio channel frequency response is 100 hertz to 20,000 hertz, direct encoding of the optical encoder 34 output or encoder interface 44 output would be very difficult because of long periods at the "zero" level would cause the frequency to be below 100 hertz and cause incorrect decoding.

FIG. 5 shows the time relationship between the north-synchronizing/mark-synchronizing pulse 66 and the frame of information 68. As mentioned above, frame of information 68 contains 5 cells, 70, 72, 74, 76 and 78. The width of pulse 66 is approximately 100 microseconds. The leading edge of frame of information 68 is delay for some time after the leading edge of pulse 66, for example, 7.5 milliseconds.

Each cell of frame 68 is the encoded asynchronized bit stream of a communications port, for example, an RS-232 port. Encoding of the frame of information may be accomplished using a multiplex frequency which is 8 times the baud rate, a harmonic of the baud rate, for example, of the communications port. This multiplex frequency is produced during a "one" which is defined by the start bit polarity. Values for a system could be 600 baud and 4800 hertz for the multiplex frequency.

The encoded signal 65 amplitude may be between 0 and 2 volts and may be produced by TTL gate through an attenuation network both of which are well-known in the art.

The configuration of the cell is two-stop bits, eight-data bits and no parity. Cell 70 is a preamble of alternating "one and zeros". (AA Hex). Cell 72 is the most significant depth byte. Cell 74 is the middle depth byte and cell 76 is the least significant depth byte. Cell 78 may be used for other purposes, such as a gamma ray value during nuclear well logging. The depth value input to VCR 50 from microcontroller 46 is normally raw depth counts not footage.

Referring again to FIG. 2, it is seen that microcontroller 46 also provides depth updates to the plotter interface 54. Microcontroller 46 also can provide an output via a standard RS232 port where it is used by a digitizing system (not shown) which correlates depth with the borehole televiewer output signal.

When the depth monitoring and recording system 38 is placed in the playback mode, the microcontroller 46 receives raw depth counts from the VCR 50.

FIG. 6 shows a block diagram for depth decoding for use in a playback circuit of VCR 50. Audio information decoder 80 receives an input from VCR 50 and provides an output to microcontroller 46. The decoding of the audio information within audio information decoder 80 is accomplished by first rejecting all frequencies except the multiplex frequency, for example, 4800 hertz, in bandpass filter 82. Comparator 84 squares the analog signal provided by bandpass filter 82 and produces a TTL signal for input to multi-vibrator 86. Multi-vibrator 86 is set to a pulse width slightly greater than the period of the multiplex frequency (for example, 4800 hertz). Multi-vibrator 86 output is the asynchronous serial input to microcontroller 46 during playback which thereby enables microcontroller 46 to read the information, display depth, and output information through another serial port to a digitizing computer as well as calculating a logging speed. A digitizing computer (not shown) can receive televiewer amplitude and travel time through another interface and correlate the received information with televiewer depth.

Recording of televiewer data is, in some instances accomplished by recording the analog signal from the borehole televiewer on a VCR 50. Some modifications are necessary particularly defeating of the AGC feature and proper vertical synchronization. The AGC must be defeated so that true analog signals may be recorded allowing accurate reproduction of acoustic amplitudes. Vertical synchronization is needed in order to set the VCR motor speed for accurate playback of the borehole televiewer analog signal.

Referring once again to FIG. 2, there is shown a borehole televiewer data recording system interface 42 which provides the analog acoustic signal developed by the ultrasonic logging apparatus 14 and transmitted along logging cable 30 through logging cable interface 40. Borehole televiewer data recording system interface 42 provides the analog acoustic signal to VCR 50.

As was mentioned above, in order to provide an accurate representation of acoustic amplitude of the received signal, the AGC circuitry of the VCR 50 must be defeated.

FIG. 7 shows the time relationships of an input signal for a borehole televiewer and a corresponding AGC adjusting signal. In particular, FIG. 7 shows a synchronization pulse 88 and an acoustic return pulse 90 which would be typical of the pulses received by VCR 50 from borehole televiewer recording system interface 42. Signal A is then level shifted, inverted and multiplexed with ground while being superimposed over the sync pulse of the televiewer signal as shown in FIG. 7, Signal B. The synchronization signal 88 is an input from the borehole televiewer system logging cable interface 40.

In order to accomplish the defeating of the AGC a minor modification to VCR 50 is required. Extra capacitance is added to the AGC synchronization detect circuitry to allow extra time between AGC pulses which is well-known in the art.

Figure 8A:
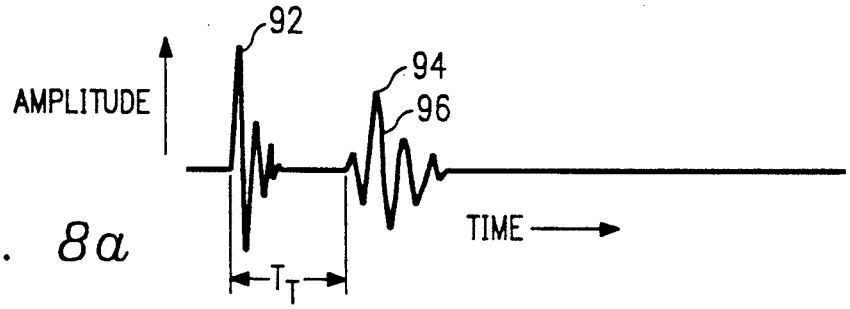
FIG. 8(*a*) shows the time relationship of a received synchronizing pulse and acoustic return signal.
Figure 8B:
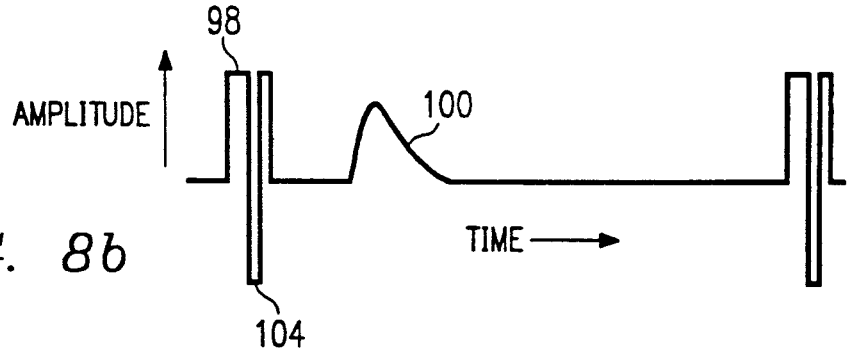
Figure 8C:
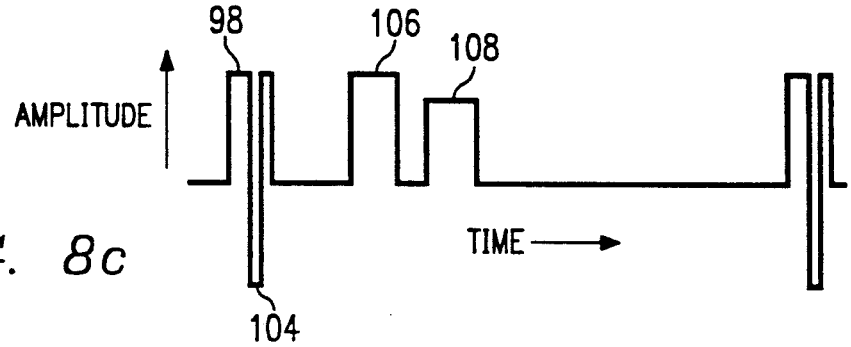

FIG. 8 shows the time relationship of a received synchronizing pulse and acoustic return signal. The interaction of the generated acoustic waveform 92 and the borehole produces an acoustic return 94 as in FIG. 8(*a*). FIG. 8(*a*) while depicting the amplitude of acoustic return 94, is not shown to scale with respect to the amplitude of the generated acoustic waveform 92. The acoustic return 94 includes a reflection portion 96 which is caused by the reflection of the generated acoustic waveform 92 off of the inner surface 22 of the casing wall. The acoustic return 94 is received by ultrasonic logging apparatus 14.

The acoustic return 94 has two measured parameters, time of travel and amplitude, which give an indication of the condition of the investigated surface. Referring to FIG. 8(*a*), the time of travel $T_t$ is the time between the initiation of the generated acoustic waveform 92 and the detection of acoustic return 94. The time of travel $T_t$ gives a measurement of twice the distance of the investigated inner surface 22 from the transducer contained in the ultrasonic logging apparatus 14. The amplitude is the peak amplitude of acoustic return 94 and it gives an indication of the type of surface being investigated. In general, any irregularities on the investigated surface will reduce the amplitude of the acoustic return.

FIG. 8(*b*) shows the application of the present invention to another method of transmitting the analog acoustic signal. In FIG. 8(*b*) the waveform in FIG. 8(*a*) has been transformed into a synchronizing pulse 98 followed by a waveform envelope whose peak amplitude 102 corresponds to the peak amplitude of acoustic return 94 and where the time of travel T is represented by the time between the synchronizing pulse 98 which is synchronized with the transmitted acoustic waveform 92 and leading detectable edge of acoustic return envelope 100. AGC defeating pulse 104 is shown superimposed on synchronizing pulse 98.

In another useful embodiment as is shown in FIG. 8(*c*), AGC defeating pulse 104 is superimposed on synchronizing pulse 98. The time of travel $T_t$ is measured between the leading edge of synchronizing pulse 98 and the leading edge of time of travel pulse 106. Amplitude information in this embodiment is provided by referring to amplitude pulse 108.

Figure 9:
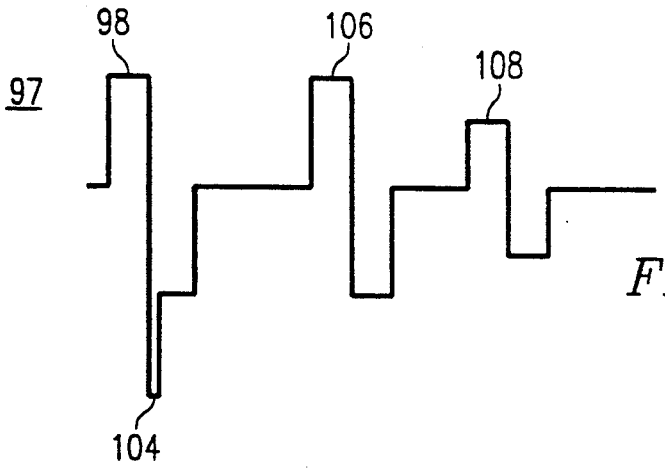
FIG. 9 shows a bipolar version of the signal in FIG. 8(*c*) with its associate AGC control pulse.

FIG. 9 shows the time relationships a modified synchronizing signal with a superimposed AGC control signal and a bipolar acoustic signal 97. Again, in FIG. 9, the AGC defeating pulse 104 is superimposed over synchronizing pulse 98 which is followed by time of travel pulse 106 and amplitude pulse 108.

Figure 10:
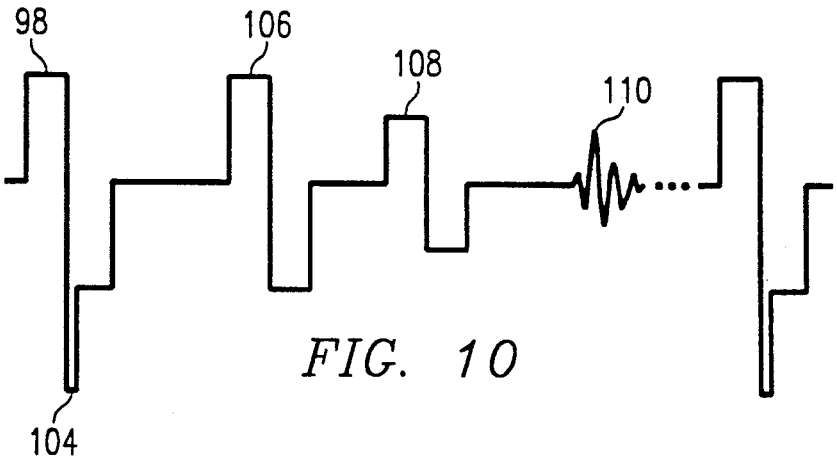
FIG. 10 shows the bipolar signal of FIG. 9 along with an added expanded acoustic pulse embodiment.

FIG. 10 shows the time relationship of the synchronizing signal and the modified acoustic signal 97 of FIG. 9 transformed into a time of travel and an amplitude signal. In another useful embodiment, AGC defeating pulse is superimposed on synchronizing pulse 98 followed by time of travel pulse 106 and amplitude pulse 108. Also included in this acoustic return information is an expanded acoustic waveform 110 which corresponds to the waveform received by ultrasonic logging apparatus 14.

Figure 11:
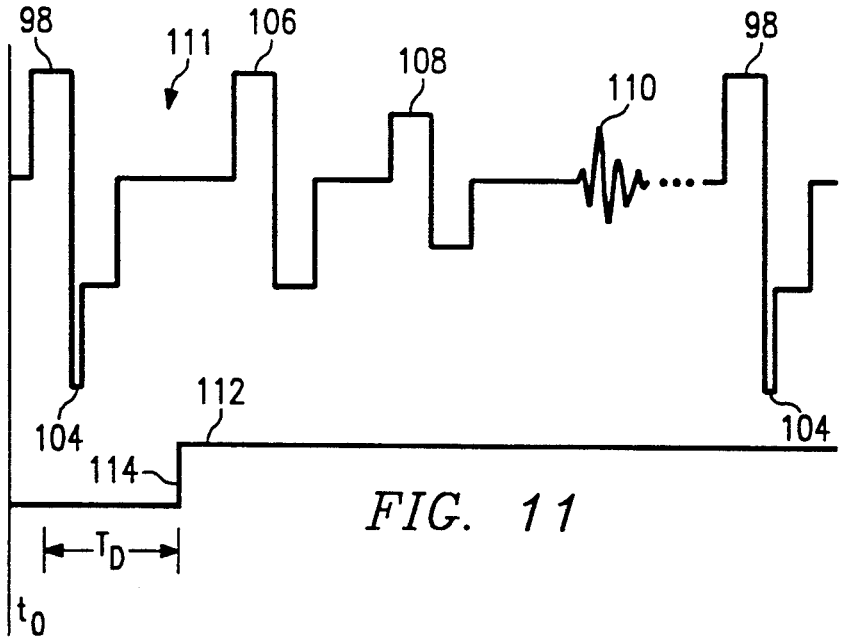
FIG. 11 shows the signal of FIG. 10 along with a vertical synchronizing signal.

FIG. 11 shows a bipolar version of the signal in FIG. 10 with its associate AGC control pulse. For purposes of illustration, FIG. 11 shows a signal similar to that shown in FIG. 10 but any borehole televiewer data signal could be used. Synchronizing pulse 98 is, in actuality, the horizontal synchronizing pulse input to the VCR 50. Acoustic information signal 111 is shown along with vertical synchronization signal 112.

Vertical synchronization for VCR 50 is provided using an external synchronization input as is well known in the art. This external synchronization input can be derived either from an internal (for example, 60 hertz) oscillator or from the ultrasonic logging apparatus 14 synchronizing pulse 98 whose frequency of, for example, 1500 hertz can be divided by 25 to yield, for example, a 60 hertz vertical synchronizing signal 112.

VCR 50 may require that a vertical synchronization signal 112 have an accuracy of plus or minus 1 hertz. This requires ultrasonic logging apparatus 14 which produce a horizontal synchronizing pulse 98 of accurate and stable frequency.

VCR 50, as is common in the prior art, has a two-head recording system which switches between the head at the 60 hertz system synchronizing frequency. When switching between recording heads, there may be a discontinuity in the recording. The borehole televiewer system has a continuous stream of acoustic return information 111. Therefore, acoustic return information 111 could be degraded by this switching glitch.

In one useful embodiment of the invention, synchronizing pulse 98 is used to generate vertical synchronization signal 112. If, for example, synchronizing pulse 98 is a 1500 hertz signal, it is divided by 25 and produces an output 60 hertz vertical synchronizing signal 112 substantially in phase with the synchronizing pulse 98. The leading edge 114 of vertical synchronizing signal 112 can be shifted by a time $T_d$ using techniques well known in the art. $T_d$ is optimally selected to place leading edge 114 of vertical synchronizing signal 112 at a position with respect to acoustic information signal 111 wherein no data is being transmitted. Thus, any discontinuity which may occur due to the shifting from one recording head of VCR 50 to another will occur during a period when no data is being transmitted and, therefore, no degradation of acoustic returned information will occur.

Although the method of the present invention has been described in relation to a cased borehole, the method can also be used with acoustic returns obtained from an open borehole.

Although several embodiments have been described in detail, it should be understood that various changes, substitutions and alterations can be made therein without departing from the spirit and scope of the invention as defined by the appended claims.

What is claimed is:

1. A depth system for measuring and recording the depth of a well logging tool comprising:

a) a depth signal interface for producing a first plurality of pulses corresponding to changes in the depth of the well logging tool;

b) a microcontroller electrically connected to said depth signal interface for transforming said first plurality of electrical pulses to a digital serial bit stream using a frequency burst technique wherein the frequency of a burst is in the audio frequency range, and for developing a digital well logging speed signal;

c) logging cable interface device electrically connected to the well logging tool for transmitting data from the well logging tool and a synchronizing pulse;

d) an analog vido recording device electrically connected to said microcontroller and said logging cable interface device for recording said digital serial bit stream a predetermined time after said synchronizing pulse on a single audio channel of the analog video recording device; and e) a display interface in electrical communication with the microcontroller for generating a video display signal said video display including the well logging speed signal.

2. The system of claim 1 wherein said audo frequency source has a frequency of between 100 and 20,000 Hz.

3. The system of claim 1 wherein said audio frequency source has a frequency of 4800 Hz.

4. The system of claim 1 wherein said encoder has an output data rate of 600 Baud.

5. The system of claim 1 wherein said recording device has a playback circuit and a recording circuit.

6. The system of claim wherein said microcontroller has a serial output for computer.

7. The system of claim 1 wherein said microcontroller produces a five word frame corresponding to the depth of the well logging tool.

8. A depth system for measuring and recording the depth of a well logging tool comprising:

a) a depth signal interface for producing a first plurality of pulses corresponding to changes in depth of the well logging tool;

b) a microcontroller electrically connected to said depth signal interface for transforming said first plurality of electrical pulses to a digital serial bit stream using a frequency burst technique wherein the frequency of a burst is in the audo frequency range;

c) logging cable interface device electrically connected to the well loggin gtool for transmitting data fro the well logging tool and a synchronizing pulse; and d) an analog video recording device electrically connected to said microcontroller and said logging cable interface device for recording said digital serial bit stream a predeterined time after said synchronizing pulse on a single audio channel of the analog video recording device.

* * * * *